United States Patent [19]

Micali

[11] Patent Number: 5,717,757

[45] Date of Patent: Feb. 10, 1998

[54] CERTIFICATE ISSUE LISTS

[76] Inventor: Silvio Micali, 459 Chestnut Hill Ave., Brookline, Mass. 02146

[21] Appl. No.: 752,223

[22] Filed: Nov. 19, 1996

Related U.S. Application Data

[60] Provisional application No. 60/025,128, Aug. 29, 1996.

[51] Int. Cl.[6] .................................. H04L 9/00; H04L 9/30
[52] U.S. Cl. .............................. 380/25; 380/23; 380/30; 380/49
[58] Field of Search .................................. 380/23, 25, 29, 380/30, 49, 50

[56] References Cited

U.S. PATENT DOCUMENTS

| | | | |
|---|---|---|---|
| 4,200,770 | 4/1980 | Hellman et al. | |
| 4,218,582 | 8/1980 | Hellman et al. | |
| 4,309,569 | 1/1982 | Merkle | |
| 4,326,098 | 4/1982 | Bouricius et al. | |
| 4,868,877 | 9/1989 | Fischer | 380/25 |
| 4,881,264 | 11/1989 | Merkle | 380/25 |
| 4,926,480 | 5/1990 | Chaum | 380/23 |
| 5,003,597 | 3/1991 | Merkle | 380/37 |
| 5,016,274 | 5/1991 | Micali et al. | 380/23 |
| 5,157,726 | 10/1992 | Merkle et al. | 380/23 |
| 5,231,666 | 7/1993 | Matyas | 380/25 |
| 5,261,002 | 11/1993 | Perlman et al. | 380/30 |
| 5,420,927 | 5/1995 | Micali | 380/23 |
| 5,432,852 | 7/1995 | Leighton et al. | 380/30 |
| 5,544,322 | 8/1996 | Cheng et al. | 395/200.12 |

OTHER PUBLICATIONS

Taher Elgamal et al, "Securing Communications on the Intranet and Over the Internet"; (Netscape Communications Corp.; Jul., 1996; 20 pages; http://home.netscape.com/newsref/ref/128bit.html).

Rivest, R.L., et al., "A Method for Obtaining Digital Signatures and Public-Key Cryptosystems", *Communications of the ACM*, 120–126 (Feb. 1978).

Lamport, L., "Password Authentication with Insecure Communication", *Communications of the ACM*, 770–772 (Nov. 1981).

Linn, J., IAB Privacy Task Force, Request for Comments No. 1113, "Privacy Enhancement for Internet Electronic Mail: Part I—Message Encipherment and Authentication Procedures" 1–30 (Aug. 1989).

Kent, S., et al., IAB Privacy Task Force, Request for Comments No. 114, "Privacy Enhancement for Internet Electronic Mail: Part II—Certificate-Based Key Management", 1–22 (Aug. 1989).

"Public Key Infrastructure Study—Final Report", *National Institute of Standards and Technology* (Apr. 1994).

International Standard ISO/IEC 9594-8, "Information technology—Open Systems Interconnection—The Directory: Authentication framework", *ISO/IEC*, second edition, Sep. 15, 1995.

Rivest, R. L., et al., "PayWord and MicroMint: Two simple micropayment schemes", *MIT Laboratory for Computer Science/Weizmann Institute of Science*, 11 pgs. (Nov. 1995).

Housley, R., et al. "Internet Public Key Infrastructure Part I: X.509 Certificate and CRL Profile", Published on the World Wide Web, 1–30 (Jun. 1996).

Farrell, S., et al. "Internet Public Key Infrastructure Part III: Certificate Management Protocols", Published of the World Wide Web, 1–36 (Jun. 1996).

"Final Text of Draft Amendments DAM 4 to ISO/IEC 9594-2, DAM 2 to ISO/IEC 9594-6, DAM 1 to ISO/IEC 9594-7, and DAM 1 to ISO/IEC 9594-8 on Certificate Extensions", 41 pages (Jun. 30, 1996).

ANSI X9.55–1955 "Public Key Cryptography for the Financial Services Industry: Extensions to Public Key Certificates and Certificate Revocation Lists" (working draft) 37 pages (Jul. 3, 1996).

ANSI X9.57–199x "Public Key: Cryptography for the Financial Services Industry: Certificate Management©" (working draft) 86 pages (Jun. 21, 1996).

Bellare, M., et al., "Incremental Cryptography: The Case of Hashing and Signing" *Proceedings of Crypto '95* 216–233 (1995).

Micali, S., "Computationally–Sound Proofs", *MIT Laboratory for Computer Science*, 55 pages, Apr. 11, 1995.

Micali, S. et al., Abstract entitled "An Efficient Zero–Knowledge Method for Answering Is He In Or Out? Questions" presented by M. Rabin at the National Computer Science Institute In Berkeley, CA (Dec. 1995).

"Escrowed Encryption Standard (EES)", Federal Information Processing Standards Publication 185, Feb. 9, 1994, 7 pps.

*Primary Examiner*—Bernarr E. Gregory
*Attorney, Agent, or Firm*—Foley, Hoag & Eliot LLP

[57] ABSTRACT

An authority provides authenticated information about a plurality of certificate identifiers by generating a data string and by identifying all the plurality of certificate identifiers and by having the authority authenticate one or more of the data string alone, the data string together with date information, or the data string together with additional information. The date information may include the date of authentication. The additional information may include a date of issuance of at least one of the certificates. The additional information may include certificate information about at least some of the issued certificates. The certificate information may include one or more of: revocation information or validity information of at least some of the issued certificates.

48 Claims, No Drawings

5,717,757

CERTIFICATE ISSUE LISTS

This application is based on U.S. provisional patent application No. 60/025,128 filed on Aug. 29, 1996.

TECHNICAL FIELD

The present invention relates generally to secure communications and more particularly to schemes for certificate management.

BACKGROUND OF THE INVENTION

In many settings, it is useful to certify data, as well as to revoke data that was previously certified. For instance, in a Public Key Infrastructure (PKI), it may be useful to certify users' public keys. Such certification may be provided in the form of a certificate which contains the certified data and vouches for the authenticity of the certified data.

In a digital signature scheme, each user U chooses a signing key $SK_u$ and a matching verification key, $PK_u$. User U uses $SK_u$ to compute a digital signature of a message m, $SIG_u(m)$, while anyone knowing that $PK_u$ is U's public key can verify that $SIG_u(m)$ is U's signature of m. Finding $SIG_u(m)$ without knowing $SK_u$ is practically impossible. On the other hand, knowledge of $PK_u$ does not give any practical advantage in computing $SK_u$. For this reason, it is in U's interest to keep $SK_u$ secret (so that only he can digitally sign for U) and to make $PK_u$ as public as possible (so that everyone dealing with U can verify U's digital signatures). At the same time, in a world with millions of users, it is essential in the smooth flow of business and communications to be certain that $PK_u$ really is the legitimate key of user U. To this end, users' public keys are often "certified" by a certificate that serves as proof that U is the legitimate owner of $PK_u$. At the same time it is also useful to be able to revoke some of the already-issued certificates when U is no longer the legitimate owner of $PK_u$ (for whatever reason) and/or when $SK_u$ has been compromised. Of course, the need for certification and certificate revocation extends beyond certifying public keys.

In many instances, certificates for users' public keys are produced and revoked by certifying authorities called CA's. A complete public key infrastructure may involved other authorities (e.g., PCAs) who may also provide similar services (e.g., they may certify the public keys of their CA's). The present discussion can be easily applied to such other authorities in a straight-forward manner.

A CA may be a trusted agent having an already certified (or universally known) public key. To certify that $PK_u$ is U's public key, a CA typically digitally signs $PK_u$ together with (e.g., concatenating it with) U's name, a certificate serial number, the current date (i.e., the certification or issue date), and an expiration date. The CA's signature of $PK_u$ is then inserted in a Directory and/or given to U himself. Note that, before certifying U's public key, it is necessary to perform additional steps, such as properly identifying user U. However, these additional steps are optional.

Upon receiving the (alleged) digital signature of user U of a message M, $SIG_u(M)$, a recipient R needs to obtain a certificate for $PK_u$. In fact, $SIG_u(M)$ may be a correct digital signature of M with respect to some public key $PK_u$, but R has no guarantee that $PK_u$ is indeed U's public key. Recipient R may obtain this certificate from the Directory, or from his own memory (if he has previously cached it), or from U himself. Having done this, R verifies (1) the correctness of the CA's certificate for $PK_u$ with respect to the CA's public key, and (2) the correctness of $SIG_u(M)$ with respect to $PK_u$.

If the CA's public key is not universally known, or cached with R, then a certificate for the CA's key may also be obtained.

Certificate retrieval is thus possible, although not necessarily cheap. Unfortunately, however, this is not the only retrieval that R needs to do. In addition, it is important that R makes sure that the certificate for $PK_u$ has not been revoked. This check, of course, may not be needed after the certificate's expiration date, but may be needed during the certificate's alleged lifetime. A user's certificate can be revoked for a variety of reasons, including key compromise and the fact that the user is no longer associated with a particular CA.

To enable a recipient to establish whether a given certificate has been revoked, it is known to have each CA periodically issues a Certificate Revocation List (CRL for short). A CRL may consist of the issuer's digital signature of a header comprising the issuer's name (as well as the type of his signature algorithm), the current date, the date of the last update, and the date of the next update, together with a complete list of revoked certificates (whose date has not yet expired), each with its serial number and revocation date. Since it is expected that a CA revokes many certificates, a CRL is expected to be quite long. It is envisaged that the CRL is provided to a Directory who may then distribute the CRL to end users.

After performing some checks on the CA's CRL (e.g., checking the CA's digital signature, checking that the CRL has arrived at the expected time, that a certificate declared revoked in the previous CRL of that CA—and not yet expired—still is revoked in the current CRL, etc.), the Directory stores it under the name of the CA.

When a user queries the Directory about the revocation of a certificate issued by a given CA, the Directory responds by sending to the user the latest CRL of that CA. The user can then check the CRL signature, the CRL dates (so as to receive a reasonable assurance that he is dealing with the latest one), and whether or not the certificate of interest to him belongs to it.

It is possible for a user to query the Directory with a serial number not corresponding to any issued certificate. (Indeed, while many times the user has already seen a certificate and accesses the Directory just to confirm the current validity of that certificate, at other times the user wishes to obtain the corresponding certificate from the Directory). If the corresponding certificate does not exist, the Directory is at a loss as to how to proceed. If the Directory responds truthfully, it may not be believed by the user. If the Directory gives the users all the certificates in its possession (or those relative to a given CA) the user may suspect that the Directory left out the certificate of interest. Indeed, even if the Directory gives the user the latest CRL of a given CA, this does not prove to the user that the certificate in question does not exist. (In fact, the actions of the Directory may actually be interpreted as saying that the certificate is valid because it does not appear to have been revoked.) Thus, in this thorny situation the Directory would have to be trusted.

SUMMARY OF THE INVENTION

According to the present invention, an authority provides authenticated information about a plurality of issued certificates by generating a data string identifying all the plurality of issued certificates and by having the authority authenticate one or more of the data string alone, the data string together with date information, or the data string together with additional information. The date information may include the date of authentication. The additional information may include a date of issuance of at least one of the certificates. The additional information may include certificate information about at least some of the issued certificates. The certificate information may include one or more of: revocation information or validity information of at least some of the issued certificates.

According further to the present invention, an authority generates authenticated information about a plurality of certificates by generating a data string identifying which of the plurality of certificates have been issued and which of the plurality of certificates have not been issued and by having the authority generate the authenticated information by authenticating one or more of: the data string alone, the data string together with date information, or the data string together with additional information.

According further to the present invention, an authority provides authenticated information about unissued certificates by generating data identifying all the unissued certificates and by having the authority authenticate one or more of: the data alone, the data together with a date of authentication, or the data together with additional information. According further to the present invention, an authority provides authenticated information about one or more unissued certificates by generating data identifying the one or more unissued certificates and by having the authority authenticate one or more of: the data alone, the data together with a date of authentication, or the data together with additional information.

According further to the present invention, an authority generates authenticated issuance information about a plurality of certificates by mapping at least two of the plurality of certificates to predetermined bit positions in a data string and having at least some bits at the bit positions convey issuance information about the at least two certificates and by generating authenticated issuance information by having the authority authenticate one or more of: the data string alone, the data string together with date information, or the data string together with additional information. Mapping to predetermined bit positions may reduce an amount of bits used to represent certificates that are mapped. The amount of bits used to represent the certificates in the authenticated issuance information may be less than the total number of bits contained in serial numbers of the certificates.

According further to the present invention, an authority generates authenticated issuance information about a plurality of certificates by generating a data string identifying all issued certificates among the plurality of certificates that share a given characteristic and by generating the authenticated issuance information by having the authority authenticate one or more of: the data string alone, the data string together with information identifying the additional characteristic, the data string together with date information, or the data string together with additional information. Each issued certificate may have an identifier belonging to an ordered set and the characteristic may include having the identifier be between a given lower bound and a given upper bound in the ordered set. Each issued certificate may have an identifier and the characteristic may include having given bits in the identifier be equal to given values or may include having a hash function applied to at least a portion of the revoked certificate yield a given value. The characteristic may include having the certificate contain a given value in a given field.

According further to the present invention, an authority generates authenticated issuance information about a plurality of certificates by generating a data string identifying all unissued certificates among the plurality of certificates that share a given characteristic and by generating the authenticated information by having the authority authenticate one or more of: the data string alone, the data string together with information identifying the additional characteristic, the data string together with date information, or the data string together with additional information. Each unissued certificate may have an identifier belonging to an ordered set and the characteristic may include having the identifier be between a given lower bound and a given upper bound in the ordered set. Each unissued certificate may have an identifier and the characteristic may include having given bits in the identifier be equal to given values or may include having a hash function applied to at least a portion of the revoked certificate yield a given value. The characteristic may include having the certificate contain a given value in a given field.

According further to the present invention, an authority generates authenticated information about a plurality of certificates by generating a data string identifying a subset containing all of the certificates among the plurality of certificates that share a given characteristic, indicating the certificates of the subset that have issued and the certificates of the subset that have not issued, and by generating the authenticated information by having the authority authenticate at least one of: the data string alone, the data string together with information identifying the additional characteristic, the data string together with date information, or the data string together with additional information.

According further to the present invention, an authority provides authenticated issuance information about certificates by choosing a plurality of characteristics such that each of the certificates possesses at least one of the characteristics, for each of the characteristics, generating a data string that identifies the characteristic and all the issued certificates possessing the characteristic, and generating the authenticated information by, for each data string, having the authority authenticate at least one of: the data string alone, the data string together with date information, or the data string together with additional information. The additional information may include revocation information for at least some of the certificates. The characteristic may include an identifier for at least some of the certificates.

According further to the present invention, an authority provides authenticated issuance information about certificates, by choosing a plurality of characteristics such that each of the certificates possesses at least one of the characteristics, for each of the characteristics, generating a data string that identifies the characteristic and all the unissued certificates possessing the characteristic, and generating the authenticated information by, for each data string, having the authority authenticate at least one of: the data string alone, the data string together with date information, or the data string together with additional information. The additional information may include revocation information for at least some of the certificates. The characteristic may include an identifier for at least some of the certificates.

According further to the present invention, an authority provides authenticated issuance information about certificates by choosing a plurality of characteristics such that each of the certificates possesses at least one of the characteristics, for each of the characteristics, generating a data string that identifies the characteristic, all the issued and unissued certificates possessing the characteristic, and information distinguishing the issued certificates from the unissued certificates, and generating the authenticated information by, for each data string, having the authority authenticate at least one of: the data string alone, the data string together with date information, or the data string together with additional information. The additional information may include revocation information for at least some of the certificates. The characteristic may include an identifier for at least some of the certificates.

According further to the present invention, an intermediary proves certificate information to a user by causing the user to receive authenticated certificate information that is provided by one or more of the techniques set forth herein. The intermediary may provide the authenticated information directly to the user. The intermediary may receive the authenticated information from one or more of: the authority, an other intermediary, or a user.

According further to the present invention, a user uses authenticated certificate information that is generated by one or more of the techniques set forth herein. The user may receive the authenticated information from one or more of: an authority, an intermediary, or an other user.

According further to the present invention, providing authenticated information about certificates includes receiving a request for information about at least one certificate including a proof that the certificate is issued, verifying that the proof is valid, and, in response to the proof being valid, providing the requested information. The proof may include providing an entire CA-authenticated certificate. Verifying may include comparing the entire CA-authenticated certificate to an on hand copy of a verified CA-authenticated certificate and/or may include comparing a function evaluated at the entire CA-authenticated certificate to the function evaluated at an on hand copy of a verified CA-authenticated certificate. The CA may authenticate the CA-authenticated certificate by digitally signing the certificate and verifying may include verifying the signature of the CA. The proof may include a suitable hash of an entire CA-authenticated certificate and/or a suitable function of an entire CA-authenticated certificate. Verifying may include comparing the hash of the CA-authenticated certificate to an on hand copy of a hash of a verified entire CA-authenticated certificate.

According further to the present invention, providing authenticated information about certificates to a requestor includes receiving a request for a first type information about at least one certificate including a proof that the requestor knows at least a portion of a second type of information, verifying that the proof is valid, and, in response to the proof being valid, providing the first type of information to the requestor. The proof may be interactive.

According further to the present invention, providing authenticated information about certificates to a requestor includes receiving a request for information about at least one certificate including a proof that the requestor knows some other suitable amount of authenticated information about the certificate, verifying that the proof is valid, and, in response to the proof being valid, providing the requested information to the requestor.

DETAILED DESCRIPTION OF THE PREFERRED EMBODIMENTS

A user of an electronic communication system may query an intermediary (such as a Directory) with certificate identification information and obtain in response the identified certificate. Certificate identification information may be a serial number, a user name, a CA, etc. For concreteness, but without limitation, assume that a user may query a Directory using the serial number and the CA corresponding to the certificate of interest. The user then obtains in response information about the certificate issued by the CA having the requested serial number.

The above procedure could present a problem if a user queries the Directory with a serial number that does not correspond to a certificate issued by the CA. In that case, the Directory, though possessing the relative certificate, may deny the user that information. Having the Directory provide the user with the latest CRL of the CA does not solve the problem either. In fact, the absence of the queried serial number from the CRL only proves that the corresponding certificate, if any, is not revoked, but leaves open the possibility that no certificate corresponding to the requested serial number (and CA) was ever issued. Since intermediaries may not be trusted, this is a problem, and may cause serious denial of service complications or attacks.

Note that, in some sense, every certificate, by definition, is issued, since certificates include data authenticated by authorities. However, since it is possible to use identifiers to refer to certificates (e.g., use a twenty bit string as a certificate serial number), the set of possible identifiers may be greater than the set of issued certificates. For instance, there may be a plurality of twenty bit strings that are not serial numbers of any certificate issued by a CA. Thus, in order to simplify the discussion herein, the term "certificate" includes identifying information that may or may not correspond to an issued certificate.

The problem of a user querying an intermediary with certificate identifying information that does not correspond to any issued certificate may be addressed by means of a new structure, called a Certificate Issue List (CIL). A CIL may include a (preferably) dated and authenticated (e.g., digitally signed) list of all the serial numbers of issued (and preferably not expired) certificates. A CIL allows a (possibly) untrusted intermediary to prove whether a given certificate has been issued. A CIL may also contain additional information. For instance, the CIL may contain the issue date for each issued certificate and/or the issue date of the CIL.

Alternatively, a CIL may include authenticated (e.g., digitally signed) and (preferably) dated information indicating all certificates that have not yet issued. Alternatively still, a CIL may include authenticated and (preferably) dated information indicating all issued and unissued certificates together with information distinguishing which certificates have been issued and which have not. Of course, when constructing a CIL, it is possible to include and optionally authenticate any other type of information, such as issue dates, revocation dates, other revocation information, validity information, etc. The information may be organized in a variety of manners (including a list or, more generally, a data string).

Preferably, a CIL is authenticated (e.g., digitally signed) by a CA. For instance, the same CA that issues certificates may also authenticate a corresponding CIL (i.e., a CIL relative to the certificates of the CA). Alternatively, a CIL may be authenticated by another CA, by a different type of authority, or by two or more appropriate entities (possibly machines).

It will be appreciated by one of ordinary skill in the art that the system described herein may be applied to public key certificates as well as any other types of certificates. It will also be appreciated by one of ordinary skill in the art that the system described herein may not only be used by an authority, but also by any intermediary, such as a directory.

Note that an intermediary includes a directory, an other user, an authority, a database, a computer file, a read-only file, or any entity that causes information to be provided to another entity. Indeed, such an intermediary may receive CIL information and send that information to other users. More generally, the intermediary may simply cause a user to receive CIL information from another entity, such as another user, an other directory, an other intermediary, an other CA, an other database, an other fie, and so forth. An intermediary may cause users to receive CIL information by simply storing such information in a file that is accessible by users. Indeed, the intermediary itself may be such an accessible file.

It will be appreciated by one of ordinary skill in the art that, although the system has been illustrated herein using serial numbers to identify certificates, it is straight-forward to practice the system by using identifiers other than serial numbers. Such identifiers include a hash (such as a one-way hash) of at least a portion of a certificate or other conventional or unconventional ways for identifying a certificate. In particular, a certificate identifier may include the name of the user about which the certificate has been issued (e.g., the owner of a public key in the case of a public key certificate) or may include the public key itself in the case of a public key certificate. For instance, a CIL may be produced by digitally signing and (preferably) dating any data identifying issued certificates, unissued certificates, or any combination thereof.

CILs may also be built in more compact ways, employing any one of a number of encoding techniques. For instance, if there are at most one million possible certificate serial numbers, a CIL may includes a digitally signed and (preferably) dated a million-bit long string S, where the ith bit of S is zero if serial number i does not correspond to an issued certificate and is one otherwise (or vice versa).

Note that the string S is obtained by mapping each certificate to a predetermined single bit location of the string S so that the value of the bit at such a location conveys information about the certificate. Note that the location of the bit is S also conveys information. The information is authenticated because the entire string S is authenticated. This system described above may be generalized in at least two ways. In the first way, at least a portion of at least one certificate in a group of certificates is mapped to one or more predetermined bit locations of a data string and by having the values of the bits at the locations convey any type of information about the certificate (e.g., identification information of the certificate, whether the certificate has been issued, whether the certificate has been revoked, and/or whether the certificate is valid as well as date information such as issue date, revocation date, or other dates). In the second way, at least a portion of at least one certificate in a group of certificates is mapped to one or more bits of a data string wherein the locations of the bits in the data string contribute information about the certificate (e.g., identification information of the certificate, whether the certificate has been issued, whether the certificate has been revoked, and/or whether the certificate is valid as well as date information such as issue date, revocation date, or other dates). Of course, the system need not be used for all certificates. In fact, it may be advantageously used for a subset of certificates.

One could apply various data compression techniques to make the data string, S, and thus the CIL, even shorter. Indeed, if the serial numbers corresponding to issued certificates are few with respect to the number of serial numbers corresponding to unissued certificates, the string S will have few ones and many more zeros, and thus could be compressed considerably. For instance, if a CA issues serial numbers in consecutive order, then when N certificates have been issued, all of the serial numbers corresponding to issued certificates are all of the integers between one and N. Thus, a CA could produce a CIL by authenticating (e.g., digitally signing) and (preferably) dating the number N (possibly together with additional information).

Data compression techniques can also be applied to other ways of identifying issued/unissued certificates, such as by having every CIL encode the difference between the serial number of one issued certificate and the serial number of the next issued certificate. For instance, assume that zero stands for the serial number of the "first" issued certificate. Let i be the serial number of actual first issued certificate, j be the serial number of the second actual issued certificate, etc. Then, the data string encoding the serial numbers of the issued certificates may consist of the number i, followed by the number j - i, etc. In particular, the values i, j - i, etc., may be encoded as follows: 00 encodes 0, 01 encodes 1, 10 encodes 2, and 11 encodes END. Then an encoding of value i may consist of a ternary representation of i followed by the end pattern 11; then a ternary representation of j - i followed by 11; and so on until all serial numbers of all the certificates are represented in the CIL.

It should be realized that such encoding are just representative ones, and that, depending on a variety of functional factors familiar to one of ordinary skill in the art, other data compression schemes may be chosen.

An alternative way to build a CIL consists of having the CA date and digitally sign an upper bound and data that determines all the serial numbers of issued certificates, where the upper bound is an integer which is greater than (or greater than or equal to) the serial number of any issue certificate.

CIL information may be conveyed using smaller structures called sub-CILs (SCIL for short) by dividing CIL information into a plurality of subsets where at least one of the subsets has at least a portion thereof authenticated. For instance, an SCIL may convey authenticated issuance information about all certificates having a serial number between a lower bound, A, and an upper bound, B. Preferably, the upper and lower bounds are authenticated and preferably are authenticated within the SCIL itself. Thus, one may determine whether a serial number X (where X is between A and B) corresponds to an issued certificate by simply examining the SCIL having A and B as upper and lower bounds, respectively. For instance, it is possible to have a first SCIL convey issuance information about all certificates having serial numbers between 1 and 1000, a second SCIL convey information about all certificates having serial numbers between 1000 and 2000, etc. Note that it is preferable that the numeric intervals of all the SCILs cover the entire serial number space (e.g., by overlapping) so that for each serial number X there exists at least one SCIL having an interval that contains X. Of course, SCILs may be used to convey other information in a manner similar to that discussed above in connection with CILs.

SCILs, like CILs, may be constructed based on unissued certificates rather issued certificates or some combination thereof. In particular, it may be useful to have SCILs that include a single unissued certificate; for instance, an SCIL may consist of a CA's signature that a given serial number does not correspond to an issued certificate. Such an SCIL is very compact and may be easily returned by a directory when a query about an unissued certificate is made.

More generally, SCILs may be implemented by using identifiers other than serial numbers. Preferably, an SCIL also includes a short description of a subset of identifiers about which issuance information is provided. For instance, there may be a plurality of characteristics such that each identifier possesses at least one of the characteristics. Then, for each characteristic, an SCIL is constructed that provides issuance information about all certificates that possess the characteristic. Therefore, it is possible to establish whether a given certificate having a given characteristic has been issued by examining a single SCIL that contains issuance information about all certificates having the given characteristic.

In an alternative embodiment, it is possible to avoid the problems generated by the possibility of a user querying an intermediary about certificate information (e.g., revocation information, validity information) about a certificate that has never been issued without having to rely on CILs. In this embodiment, the user is required to provide a proof that a particular certificate has been issued in the query about the certificate. In the absence of the proof, the intermediary does not respond. Thus, in the resulting system, when the intermediary does not respond, there is no ambiguity as to why service is denied. In prior art systems without CILs, when a user requests from an intermediary information about a given certificate, if the intermediary does not provide the requested information, the user does not know whether the intermediary is illegitimately denying service, or whether the intermediary is not providing the requested information about the certificate because the certificate never existed. The user may have to go to court in order to find out which is the case. In contrast, in the embodiment described above, if the intermediary does not respond after the user provides the proof, then it is clear that the intermediary is unfairly denying service to the user. An additional advantage of the embodiment is that it prevents the user from obtaining certificate information about certificates the user has no knowledge of.

Any proof of certificate issuance may be provided by the user in the system described herein. For instance, the user may required to query an intermediary with the CA-signed certificate itself (rather than an identifier of the certificate). The signature of the CA is proof that the certificate was issued by the CA, even though the certificate may no longer be valid. Upon receiving such a proof, the intermediary may easily inspect and verify the proof. For instance, the intermediary may verify the CA's digital signature and then provide the user with the requested certificate information (e.g., validity information, revocation information, etc.). Alternatively, the intermediary may have on hand a verified copy of the CA-signed certificate, in which case the intermediary may compare the on hand copy with the proof presented by the user. For instance, the verified copy may be on hand because the intermediary has received a copy of the certificate in the past, and has already verified the CA's signature of the certificate. Therefore, by keeping this verified copy of the certificate on hand, the intermediary avoids having to verify the certificate repeatedly. Notice that the intermediary may be the CA itself, in which case a verified copy of the certificate may simply be the certificate issued by the CA, which the CA need not verify.

Notice, however, that such a proof of issuance provided by the user may be quite long (because a CA-signed certificate may be quite long) while a suitable identifier for the certificate may be relatively short. Therefore, in an alternative embodiment, a proof of issuance of a certificate may consist of a suitable hash of the CA-signed certificate. For instance, rather than sending to the intermediary the CA-signed certificate, the user first performs a hash of the certificate so as to obtain a shorter string, S, and then sends S and an identifier of the certificate to the intermediary. A hash function is suitable if it provides sufficient proof that the string S was constructed using the CA-signed certificate. (For instance, the hash function that, given a CA-signed certificate returns the serial number of the certificate may not be suitable in this context.) The intermediary may then fetch a copy of the CA-signed certificate and hash the certificate and verify that the hash equals S. Alternatively, the Intermediary may have on hand a hash for the verified certificate. Therefore, upon receiving S from a user, the intermediary may directly compare S with the stored hash. Alternatively still, the proof may consist of a hash of the certificate together with additional information, such as the current date, in which case the proof may change for the same certificate and cannot be reused.

A hash function is useful here because a hash function produces fewer bits. However, any suitable function of the certificate (or a portion thereof) could be used, including an encryption function (preferably with a intermediary's key).

Generally, it should be understood that a proof of certificate issuance includes any interactive proof that the user knows that the certificate has been issued. For instance, the intermediary may provide the user with a function and ask the user to return the value of the function applied to the certificate.

Note that a proof that a certificate has been issued includes any authenticated information that the certificate has been issued. For example, a CIL or an SCIL (or a one-way hash of either) could be such a proof.

Notice that the certificate information provided by the intermediary to the user may contain much more information than the fact that the certificate has been issued. For instance, if the queried certificate has been revoked, then the intermediary may provide the user not only with just the information that the certificate is revoked, but also with additional information, such as revocation date, reasons for revocation, name of the certificate owner, etc. Notice too that the proofs provided by the user to the intermediary contain a variable amount of information. For instance, if the proof consists of the certificate itself, then the proof shows that the user knows a lot of information about the certificate (such as issuance date, owner's name, etc.). In contrast, if the user provides the intermediary with a CIL when asking for information about a given certificate, the user only shows the user knows the mere fact that the certificate has been issued. Thus, it may be desired that the intermediary provides certain types of certificate information only to users who know at least certain other types of information about the certificate. This may be accomplished by requiring that the user provides certain types of proofs to the intermediary in order to receive certain types of certificate information.

A suitable proof that a requesting user knows a given type of information about a certificate about a public key PK may consist of a digital signature of a given message relative to PK. For instance, such proof may be provided to the requesting user by the owner of public key PK. In such a case, the proof may be viewed as an authorization by the owner of PK to enable the requesting user to acquire information about PK's certificate. Preferably, such a proof may include the name of the requesting user (so that the intermediary does not provide certificate information about PK's certificate to other users), or date information (so that the intermediary does not provide information about PK's certificate after a given date).

More generally, the intermediary may provide certificate information to a user, given an authorization (e.g., an authenticated authorization of a proper authority). For instance, a CA may give such authorization to at least a subset of the users that the CA certifies. This authenticated authorization of the CA enables an authorized user of the CA to retrieve a given type of information about all certificates issued by the CA.

In general, proof of knowledge of a certificate is useful because a certificate may be very long. Thus, a user may just store a signature relative to a given public key PK and a proof of knowledge of PK's certificate rather than the entire certificate of PK and the signature relative to PK. The proof of knowledge about PK's certificate will in fact enable the user to obtain PK's certificate in the future if needed. A particular proof of knowledge of a certificate digitally signed by a CA may include of some given bits of the CA's signatures.

Another method to prevent denial of service problems described above includes having the intermediary never provide a CA-signed certificate in response to a request that identifies the certificate. Indeed, the CA may legitimately only provide to users information, like a CRL, that exists irrespective of a certain certificate existing or having been issued.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for an authority to provide authenticated information about a plurality of issued certificates, comprising the steps of:
   (a) generating a data string that includes information identifying all the plurality of issued certificates; and
   (b) having the authority authenticate the data string.

2. A method according to claim 1, wherein the data string further includes information indicating a date of authentication of the data string.

3. A method according to claim 1, wherein the data string further includes information indicating a date of issuance of at least one of the certificates.

4. A method according to claim 1, wherein the data string further includes certificate information about a subset of the issued certificates.

5. A method according to claim 4, wherein the certificate information includes at least one of: revocation information and validity information of the subset of the issued certificates.

6. A method for an authority to generate authenticated information about a plurality of certificates, comprising the steps of:
   (a) generating a data string indicating a first set of identifiers, where identifiers, in the first set correspond to issued certificates, and a second set of identifiers, wherein identifiers of all issued certificates are outside the second set; and
   (b) having the authority generate the authenticated information by authenticating the data string.

7. A method according to claim 6, wherein the data string further includes information indicating a date of authentication of the data string.

8. A method according to claim 6, wherein the data string further includes certificate information about a subset of the certificates.

9. A method according to claim 8, wherein the certificate information includes at least one of: revocation information and validity information of the subset of the certificates.

10. A method according to claim 6, wherein the data string further includes a date of issuance of at least one of the certificates.

11. A method for an authority to provide authenticated information about certificate identifiers, comprising, the steps of:
    (a) generating data indicating a set of identifiers, wherein an identifier of each issued certificate is outside the set; and
    (b) having the authority authenticate the data.

12. A method according to claim 11, wherein the data further includes certificate information about issued certificates.

13. A method to provide authenticated information about one or more unissued certificate identifiers, comprising the steps of:
    (a) generating data that includes information identifying the one or more unissued certificate identifiers; and
    (b) authenticating the data.

14. A method for an authority to generate authenticated issuance information about a plurality of certificate identifiers, comprising the steps of:
    (a) mapping at least two of the plurality of certificate identifiers to predetermined bit positions in a data string and having a subset of bits at the bit positions convey issuance information about the at least two certificates, the issuance information indicating whether each of the certificate identifiers corresponds to an issued certificate; and
    (b) generating authenticated issuance information by having the authority authenticate the data string.

15. A method according to claim 14, wherein mapping to predetermined bit positions reduces an amount of bits used to represent certificates that are mapped.

16. A method according to claim 14, wherein an amount of bits used to represent the certificates in the authenticated issuance information is less than a total number of bits contained in serial numbers of the certificates.

17. A method to generate authenticated issuance information about a plurality of certificates, comprising the steps of:
    (a) generating a data string containing information identifying all issued certificates among the plurality of certificates that share a given characteristic; and
    (b) generating the authenticated issuance information by authenticating the data string.

18. A method according to claim 17, wherein each issued certificate has an identifier belonging to an ordered set and the characteristic includes having the identifier be between a given lower bound and a given upper bound in the ordered set.

19. A method according to claim 17, wherein each issued certificate has an identifier and the characteristic includes having given bits in the identifier be equal to given values.

20. A method according to claim 17, wherein each issued certificate has an identifier and the characteristic includes having a hash function applied to at least a portion of each issued certificate yield a given value.

21. A method according to claim 17, wherein the characteristic includes having the certificate contain a given value in a given field.

22. A method to generate authenticated issuance information about a plurality of certificate identifiers, comprising the steps of:

(a) generating a data string containing information identifying all unissued certificate identifiers that share a given characteristic; and (b) generating the authenticated information by authenticating the data string.

23. A method according to claim 22, wherein each unissued certificate identifier belongs to an ordered set and the characteristic includes having the identifier be between a given lower bound and a given upper bound in the ordered set.

24. A method according to claim 22, wherein the characteristic includes having given bits in the identifier be equal to given values.

25. A method according to claim 22, wherein the characteristic includes having a hash function applied to at least a portion of the unissued certificate identifier yield a given value.

26. A method according to claim 22, wherein the characteristic includes having the certificate contain a given value in a given field.

27. A method for an authority to generate authenticated information about a plurality of certificate identifiers, comprising the steps of:

(a) generating a data string containing information identifying a set containing all of the certificate identifiers that share a given characteristic and correspond to issued certificates, at least one of the issued certificates not being revoked; and (b) generating the authenticated information by having the authority authenticate the data string.

28. A method for an authority to provide authenticated issuance information about issued certificates, comprising the steps of:

(a) choosing a plurality of characteristics;

(b) for each of the characteristics, generating a data string that contains information that identifies the characteristic and all the issued certificates possessing the characteristic, wherein at least one of the certificates is not revoked and wherein each of the certificates possess at least one of the characteristics; and (c) generating the authenticated information having the authority authenticate each of the data strings.

29. A method according to claim 28, wherein at least one of the data strings further includes revocation information for a subset of the certificates.

30. A method according to claim 29, wherein the characteristic includes an identifier for a subset of the certificates.

31. A method for an authority to provide authenticated issuance information about certificate identifiers, comprising the steps of:

(a) choosing a plurality of characteristics wherein each of the certificate identifiers possesses at least one of the characteristics;

(b) for each of the characteristics, generating a data string containing information that indicates the characteristic and a set of unissued certificate identifiers possessing the characteristic; and (c) generating the authenticated information by having the authority authenticate each of the data strings.

32. A method according to claim 31, wherein at least one of the data strings includes certificate information for a subset of issued certificates.

33. A method according to claim 31, wherein at least one of the characteristics corresponds to an identifier for at least one of the certificates.

34. A method to provide authenticated issuance information about certificate identifiers, comprising the steps of:

(a) choosing a plurality of characteristics wherein each of the certificate identifiers possesses at least one of the characteristics;

(b) for each of the characteristics, generating a data string that identifies the characteristic, all the identifiers for issued and unissued certificates possessing the characteristic, and information distinguishing the issued certificate identifiers from the unissued certificate identifiers; and (c) generating the authenticated information by authenticating each of the data strings.

35. A method according to claim 34, wherein the at least one of the data strings further includes revocation information for a subset of the certificates.

36. A method according to claim 34, wherein the characteristic corresponds to identifiers for a subset of the certificates.

37. A method for providing authenticated information about certificates, comprising the steps of:

(a) receiving a request for information about a certificate including a proof that the certificate is issued;

(b) verifying that the proof is valid; and (c) in response to the proof being valid, providing the requested information.

38. A method according to claim 37, wherein the proof includes providing an entire CA-authenticated certificate.

39. A method according to claim 38, wherein verifying includes comparing the entire CA-authenticated certificate to an on hand copy of a verified CA-authenticated certificate.

40. A method according to claim 38, wherein verifying includes comparing a function evaluated at the entire CA-authenticated certificate to the function evaluated at an on hand copy of a verified CA-authenticated certificate.

41. A method according to claim 38, wherein a CA digitally signs the certificate to authenticate the certificate and verifying includes verifying the signature of the CA.

42. A method according to claim 37, wherein the proof includes a hash of an entire CA-authenticated certificate.

43. A method according to claim 42, wherein verifying includes comparing the hash of the CA-signed certificate to an on hand copy of a hash verified entire CA-signed certificate.

44. A method according to claim 37, wherein the proof includes a given function of an entire CA-authenticated certificate.

45. A method for providing authenticated information about certificates to a requestor, comprising the steps of:

(a) receiving a request for a first type of information about at least one certificate including a proof that the requestor knows at least a second type of information about the certificate;

(b) verifying that the proof is valid; and (c) in response to the proof being valid, providing the first type of information to the requestor.

46. A method according to claim 45, wherein the proof is interactive.

47. A method according to claim 45, wherein the second type of information is authenticated.

48. A method of providing to a user authenticated information about an identifier for a certificate, comprising the steps of:

(a) having the user provide the identifier to an intermediary; and (b) having the intermediary cause the user to receive authenticated information indicating that the identifier does not correspond to an issued certificate.

* * * * *